July 9, 1929.  J. F. NEWSOM  1,719,991
HEAT CONTROL FOR GAS COOK STOVES
Filed June 15, 1925   3 Sheets-Sheet 3
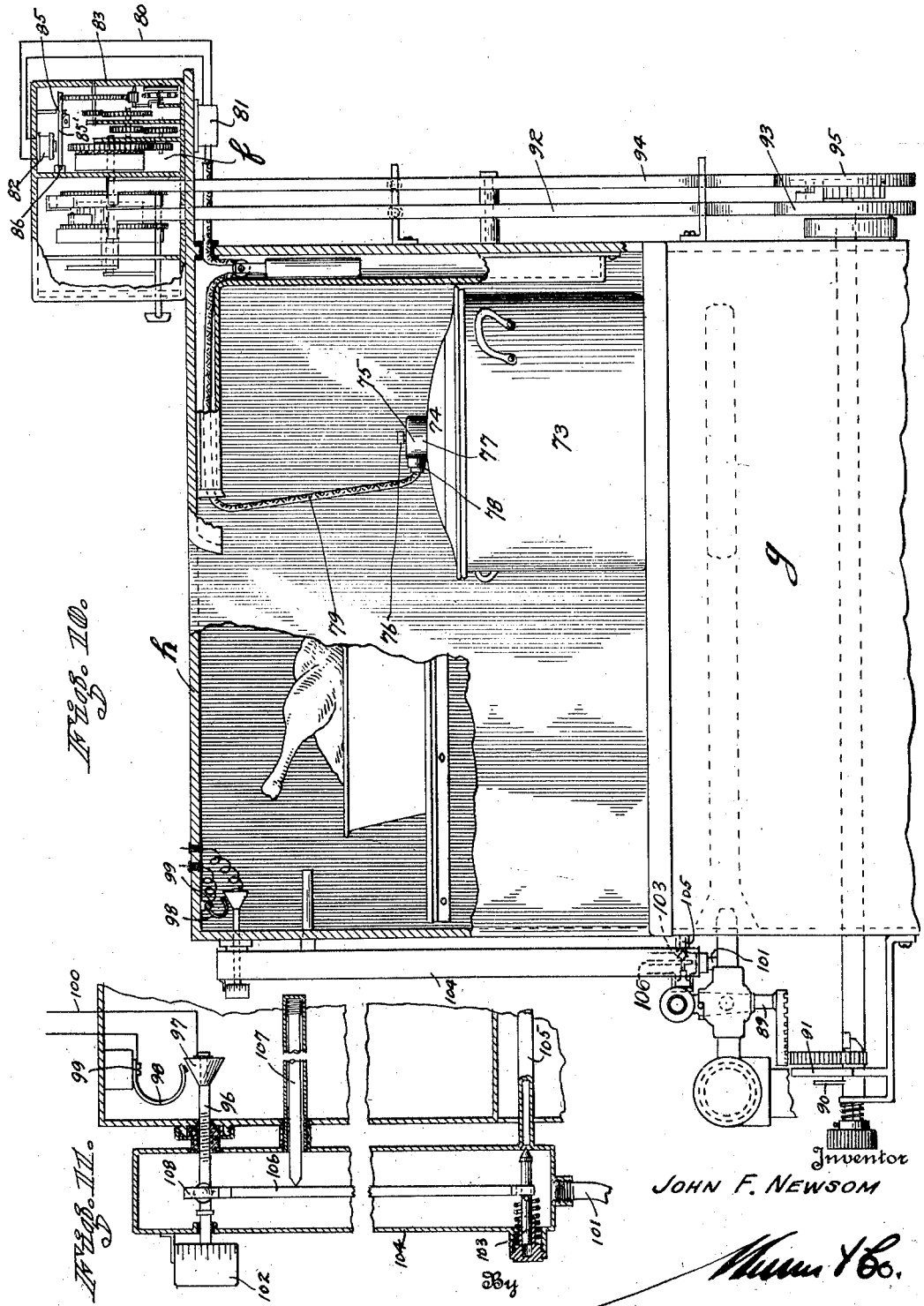
Inventor
JOHN F. NEWSOM
By
Attorneys.

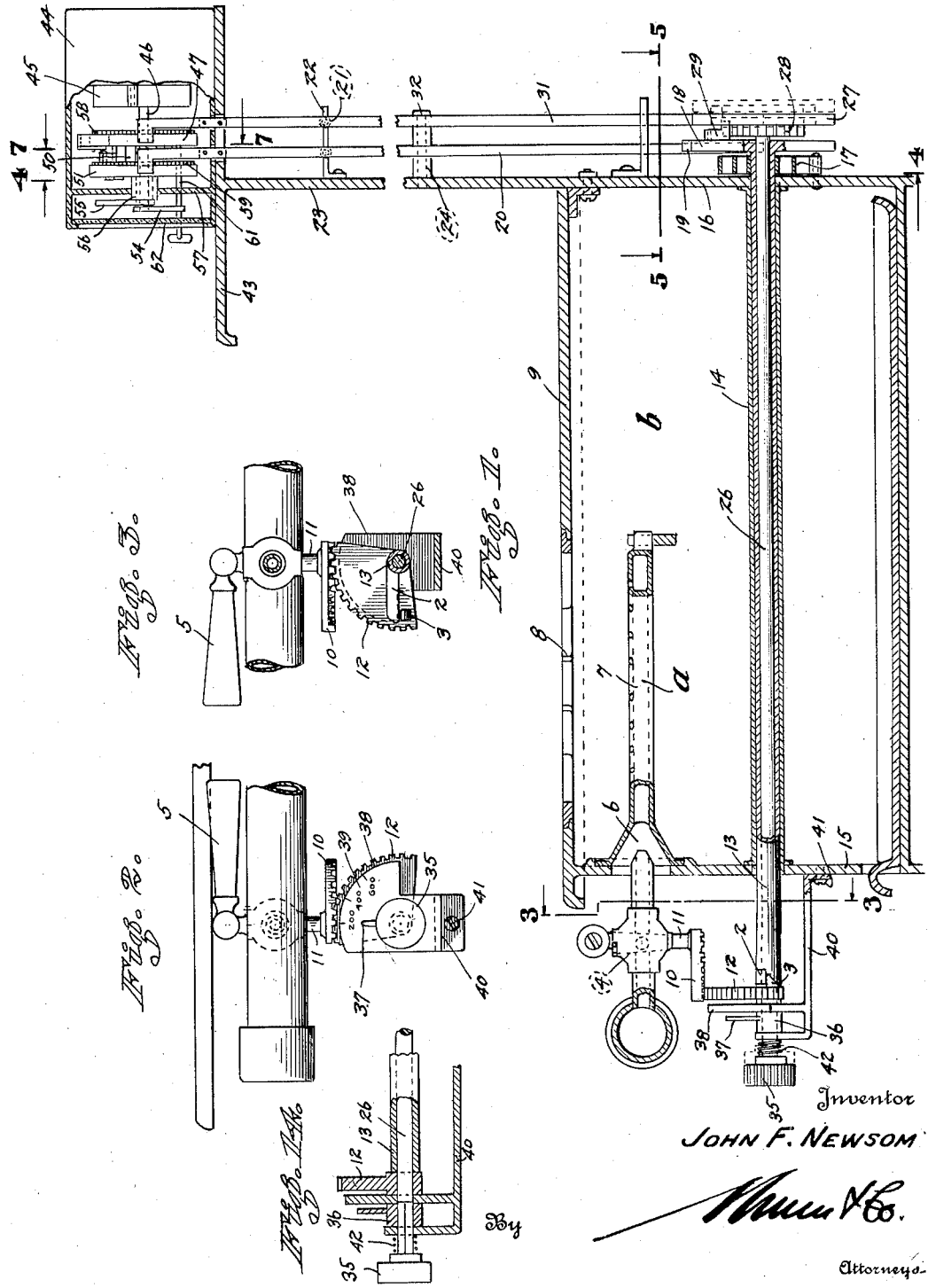

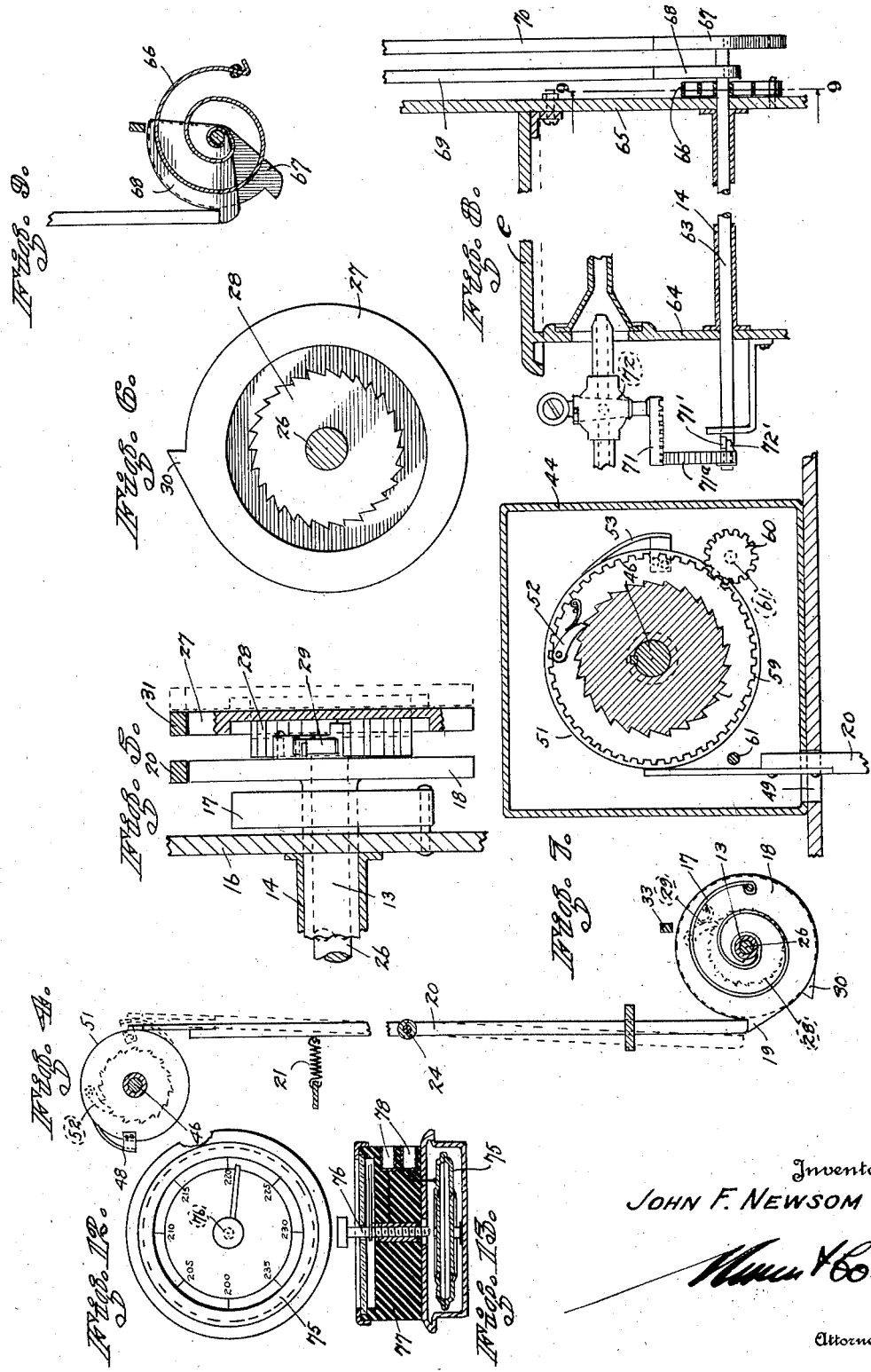

Patented July 9, 1929.

1,719,991

UNITED STATES PATENT OFFICE.

JOHN F. NEWSOM, OF PALO ALTO, CALIFORNIA.

HEAT CONTROL FOR GAS COOKSTOVES.

Application filed June 15, 1925. Serial No. 37,292.

The present invention relates to improvements in temperature control apparatus for use in connection with cooking stoves of the gaseous fuel type.

The invention has for its general object, to provide for modifying the effective cooking temperature of the heat from the burner of a gas stove after the material being cooked has been thermally acted upon for selected, predetermined intervals of time. Another object is to provide for modifying the effective cooking temperature at the end of a selected predetermined period of time, after the material being cooked has attained a selected predetermined temperature. The above and other objects are accomplished by instrumentalities pointed out in the following specification.

The invention is clearly defined in the claims.

A satisfactory embodiment of the invention is illustrated in the accompanying drawings forming part of the specification and in which:—

Figure 1 is a vertical cross-section of a well-known form of gas cooking stove, showing one form of my device partly in use.

Figure 2 is a detail front elevation of a portion of the fuel valve operating mechanism.

Figure 3 is a rear elevation of Figure 2 on the line 3—3 of Figure 1.

Figure 4 is a vertical cross-section on the line 4—4 of Figure 1.

Figure 5 is a detail horizontal cross-section on the line 5—5 of Figure 1.

Figure 6 is a detail front elevation of the low heat keeper disk.

Figure 7 is a vertical cross-section on line 7—7 of Figure 1.

Figure 8 is a vertical contracted cross-section of a gas stove equipped with a modified form of valve operating device.

Figure 9 is a cross-section on the line 9—9 of Figure 8, looking in the direction of the arrows.

Figure 10 is a view of another well known form of gas range partly in section and showing another modification of my device in use.

Figure 11 is a contracted vertical cross-section on an enlarged scale of the thermal control and a portion of the oven on the left of Figure 10.

Figure 12 is a detail plan view of the thermally operated device for controlling the operation of the time controlled device.

Figure 13 is a vertical cross-section of Figure 12.

Figure 14 is a detail partly in section and side elevation of burner operating shafts.

The form of the invention shown in Figure 1 operates to permit of obtaining what will subsequently be termed high heat from burner $a$ for a selected predetermined period of time, and then an intermediate or low heat for a further selected predetermined period of time. In order to produce high heat, the valve-handle 5 is turned for a suitable angular distance to open the valve 4, after which the combustible mixture of gas and air, formed in the mixing chamber 6, is ignited at the openings 7 of burner $a$, which underlies the grid 8. The receptacle holding the material to be cooked, and not herein shown, is disposed upon the grid 8 which is arranged in the top 9 of the body of the gas range $b$. In turning the valve-handle 5 to obtain high heat, a toothed segment 10, fixed to the lower end of valve stem 11, turns a companion toothed segment 12, loosely mounted on rod 26. Segment 12 carries a tooth 3 that engages an arm 2 fixed to the outer end portion of a tubular shaft 13. Casing 14, fixed at its opposite ends to the front wall 15 and back wall 16 of body $b$, provides a protection and bearing for shaft 13, the inner end of which extends through an opening in the back wall 16 and through operating coil spring 17, which may be permanently tensioned, and the inner and outer ends of which are respectively secured to the shaft 13 and the rear wall 16, as shown in Figures 1 and 4. The turning of the shaft 13 tensions the spring 17 and this tension, when the shaft 13 is released, is sufficient to turn the said shaft together with the toothed segments and valve stem and thereby close the gas valve. Shaft 13, while turning, operates a disk 18, fixed to the end of the shaft and provided with a peripheral angular-shaped tooth 19, which extends vertically upward when the valve 4 is closed, and laterally outward when the valve is open. In the opening movement of the valve 4, the periphery of disk 18 is in contact with the lower end of a latch bar 20, which swings laterally outward when wiped by tooth 19, as shown by dotted lines in Figure 4. When the tooth 19 turns beyond the lower end of the bar 20, a retractile spring 21, connected to the upper portion of the bar and to a bracket 22, secured to the vertical extension 23 of back-plate 16, causes the bar 20, which is pivoted as at 24 to the extension 23, to turn inwardly until its lower end abuts the periphery of the disk above the tooth, as shown by full lines in Figure 4. This action on the part of the spring places the lower end of the bar in the path of return movement of the tooth, so that when the handle 5 is released after opening valve 4, the closing movement of the valve, under the action of the coil spring 17, is prevented. The shaft 26 is rotatable independently of these members. A disk 27, corresponding to the disk 18, is arranged adjacent thereto and is fixedly secured to the portion of the shaft 26, extending beyond shaft 13. A ratchet wheel 28 is disposed in the intervening space between the disks 18 and 27, and made to turn with disk 28 as by being formed therewith, as shown in Figure 6. A spring pressed pawl 29, connected to the adjacent side of disk 18, overrides the ratchet wheel 28, when disk 18 is turned in a contra-clock-wise direction, to engage the tooth 19 thereof with latch-bar 20. The ratchet wheel 28 underrides pawl 18 when disk 27 is turned by shaft 26 in a clockwise direction, and in so turning adjusts a peripheral, angular shaped tooth 30 thereon to various angular distances from the lower end portion of a latch bar 31, corresponding to and pivoted alongside of the latch-bar 20, as indicated by 32 in Figure 1.

In Figure 4 the tooth 30 is adjusted to a position below tooth 19, for an angular distance from the lower end of the latch-bar 31, less than the angular distance between the tooth 19 and stop 33, which is secured to the back plate 16. The stop, by intercepting tooth 19, limits the movement of the disk 18 in a clock-wise direction, as viewed in Figure 4. When the latch-bar 20 moves away from the tooth 19, as shown by dotted lines, and disk 18 turns clock-wise in Figure 4, under the action of spring 17, pawl 29 engages the ratchet wheel 28, whereupon both disks turn as a unit until the tooth 30 abuts the lower end of the latch-bar 31, at which time the fuel valve 4 is but partly closed, and the supply of gas to the burner $a$ is thereby reduced so that a secondary heat is obtained. A turning knob 35 is provided at the outer end of the shaft 26 and a non-cylindrical outer end portion of said shaft slides in a non-cylindrical opening of a sleeve 36, carrying an indicator hand 37, arranged in front of an arcuate plate 38, which is provided with the divisions of a thermal scale 39, carried by a bracket 40, supported as indicated by 41, and forming a support for the outer end portion of shaft 26. The construction and assembly of the indicator hand 37, scale 39, valve 4 and disk 27 are such that when the knob 35 turns the hand 37 to any selected division of scale 38, the tooth 30 is then spaced from the lower end of the latch-bar 31, for an angular distance corresponding to the distance which the valve 4 will turn under the action of the coil-spring 17 in moving from wide open or high heat position to the desired low heat position. Figure 4 shows the approximate relative positions of the teeth 19 and 30 after the indicator hand 37 has been moved to the position shown in Figure 2.

These relative positions will of course change with other adjustments of the indicator hand 37, with respect to the divisions of the scale. It will be noted in Figures 1 and 5 that the shaft 26 is endwise slidable in tubular shaft 13 and is normally held in the position shown by full lines by a compression spring 42 surrounding the outer end portion of the shaft 26 and interposed between the outer end of bracket 40 and the base of knob 35. When pressure is applied to the knob 35, the spring 42 yields and the shaft 26 moves longitudinally and thereby shifts the disk 27 beyond the latch-bar 31, as shown by dotted lines in Figures 1 and 5. The ratchet wheel 28 is sufficiently wide to maintain engagement with the pawl 29 when the disk 28 is shifted, so that liability of jamming on the part of these members is prevented under the action of the compression spring 42, when the knob 35 is released and the parts are returning to normal position. When disk 27 is shifted, continuous rotation thereof in a clockwise direction and of the parts connected thereto is permitted.

In view of this, if the indicator hand 37 be inadvertently set opposite a heat division on the scale indicating a secondary temperature higher than required, then the proper adjustment can be effected by a further turning of the knob 35 in a clock-wise direction until the hand is opposite the required division of the scale.

Supported in any convenient location, as upon the upper shelf 43 of the stove, is a casing 44 containing a motor such as a clock-work mechanism, the main spring of which is indicated by 45. The hand shaft 46 of the clock-work, which winds the main spring, is extended outwardly and has keyed thereto a cam disk 47, the sloped peripheral tooth 48 of which is adapted, at a selected predetermined time, to disengage the latch-bar 31 from the disk 27 by engaging the extended upper end of the latch-bar, which is directed through openings in the shelf and casing and into contact with the periphery of the disk 27, as shown in Figures 1 and 7. A ratchet wheel 50, also keyed to the hand-shaft, rotates in one direction a second cam disk 51, which is loose on shaft 46, by engaging with a spring pressed pawl 52, carried by the second cam disk 51. A peripherally disposed sloped tooth similar to tooth 48 is carried by the second cam disk 51, is adapted at a selected predetermined time to disengage the latchbar 20 from the tooth 18, by engaging the extended upper end of the latch bar 20, which is directed through the openings 49 and into contact with the periphery of the second cam disk 51. An hour-hand 54 is carried by the outer end of the shaft 46, and a minute-hand 55 is connected to a hub extension 56 of the second cam disk 51.

When these hands are turned in a contra clock-wise direction, the hand shaft turns and operates to tension the main spring 45, and the cam disks are also turned so that the teeth thereof are arranged for definite angular distances from the upper ends of the latch bars 20—31. In the present instance the clock work mechanism is adapted to operate the hand shaft to complete one revolution in about four hours and in view of this the dial plate 57 is marked with a suitable number of divisions and sub-divisions of four hours. When the minute hand is set at one of the sub-divisions, as for instance one indicating the first half hour and the hour hand is set at a division indicating one hour, then the cooking period will continue for one hour, and in this period two selected and different cooking temperatures will be had for selected, predetermined periods of time. 58 and 59 are spur gear wheels rigidly secured to one face of the cam disks 47 and 51, and disposed to mesh with pinions, one of which is shown in Figure 7 and indicated by 60. Key shafts 61 extend through the front transparent panel 62 of the casing and provide supports for the pinions and operate to rotate these for the purpose of adjusting the cam disk hands 54—55, and winding the main spring 45.

In the modified form shown in Figure 8, the selective temperature feature is eliminated and two fixed degrees of heat are had. In this connection a single shaft 63 extends through the front and back plates 64—65 of the stove e, and carries on the end portion beyond the back plate, a coil spring 66 and toothed segments 67—68. Spring 66 is disposed and functions in correspondence with coil spring 17, and segments 67 and 68, which are rigidly secured to the shaft 63, are arranged with their teeth spaced apart for fixed distances and in operative relation to the lower ends of the latch bars 69—70, which are identical with latch-bars 20 and 31, and operated by a time controlled mechanism corresponding to that previously described. The segmental gearing connection 71, between the outer end of shaft 63 and valve 72, operates to turn the valve for fixed distances when the segments 68—67 are successively released by the latch-bars 69—70, and turned by the spring 66. This turning action is accomplished by the tooth 71', fixed to shaft 63, engaging the lug 72' on the tooth segment 71ª, which is loosely mounted on shaft 63, and the teeth of which engage the teeth on 71.

In the modified forms, shown in Figures 10 and 11, the cooking utensil 73 is provided with a detachable cover 74, which carries a thermostat 75, herein shown as of the expanding fluid type and in thermal contact with the interior of receptacle 73. An adjustable circuit closer, herein shown as having a screw threaded shank 76, is screwed into a bearing in the cell or casing 77. The pointed end of shank 76 is adjustable to various distances from the thermostat for the purpose of maintaining these elements in spaced relation for various distances until the expansion of the thermostat in response to a predetermined temperature within the receptacle, closes the gap by making contact with the pointed end of shank 76. The elements of an ordinary electric plug and socket connection 78 are electrically connected to the shank 76, thermostat 75, and one end of an electric portable 79, which is connected to the wires 80 of an electromagnet 82, located within the casing 83, containing the time controlled apparatus f and arranged upon the upper shelf 84 of the gas stove g. One end of the armature 85 is pivoted as at 86, within the casing and the free end portion extends over one of the toothed wheels of the time controlled mechanism f, with which it engages and holds the same inoperative while the magnet 82 is deenergized. Casing 77 is provided with a thermal scale 87 and a finger 88 carried by shank 76 is turnable to any of the various divisions which are marked to indicate different degrees of temperature. The construction and arrangement of the parts are such that when the finger 88 is moved to indicate any required temperature on the scale, then by virtue of the adjustment of shank 76, the thermostat will cooperate with the shank to close the electro-magnetic circuit when the indicated temperature is had, by the material being cooked within the receptacle.

Let it be supposed that the material in receptacle 73 is to be cooked in boiling water for a selected, predetermined period of time, as for instance one-half hour, and then cooked at a lower temperature for another half hour. Finger 88 is first adjusted to indicate 212° and the minute and hour hands of time controlled apparatus f, identical to that previously described, respectively adjusted to indicate one-half hour and one hour on the dial of f. High heat is obtained by opening valve 89, corresponding to valve 4, and turning finger 90, corresponding with finger 37, to a point of scale 91, indicating a temperature below 212°, as for instance 175°. When the temperature of the material within the receptacle 73 attains 212°, the electromagnet 82 disengages armature 85, from the clockwork and engages it with a resilient latch 85', whereupon the action of the time controlled mechanism operates at the end of the first half hour period to disengage latch bar 92 from disk 93, and then at the end of the second half hour period disengages latch bar 94 from disk 95. In this connection it is to be understood that the said latch bars and disks, together with the parts connected thereto, as shown in Figure 10, are identical with the structures described in connection with Figures 1 to 7 inclusive. Figures 10 and 11 show the applicability of this invention to the oven of a gas stove equipped with an ordinary form of thermally operated fuel control, the spring operated needle valve 103 of which controls the flow of gas from the casing 104 to the oven burner 105. The restraining lever 106, which is fulcrumed upon the expanding solid thermostat 107 extending into oven $h$, has its upper end adapted for the purpose of the present invention, as by a resilient yoke 108, to frictionally bind upon the spindle 96 and yet permit turning thereof.

In this instance also, the inner end portion of the adjusting spindle is extended and directed into the oven $h$, where it terminates in an enlargement as for instance, a coneshaped head 97, which upon turning the spindle, is adjustable to various distances from the end of a curved thermostatic bar 98, secured within the oven as at 99. The head 97 and the bar 98 provide the terminals of an electric circuit, the wires of which are indicated by 100. An electromagnet and a transformer, corresponding of magnet 82, and transformer 81 are included in the circuit. The magnet controls the operation of a time controlled mechanism corresponding to F in Figure 10 and counterparts of the device there shown or previously described for operating valve 89 or the other burner valves are employed for operating the main oven burner valve, (not shown), which is connected to the fuel supply pipe 101. With the construction shown the knob 102 is turned until a division of the scale thereof, indicating the temperature required for cooking, is opposite the indicator hand. The time controlled apparatus is then adjusted to correspond with the period of time required for cooking at the previously selected temperature, after which the main oven burner valve is operated. When the selected, predetermined temperature is had in the oven $h$, the bar 98 moves into contact with the part 97, thereby closing the electromagnet circuit and releasing the time controlled apparatus to operate for a previously selected predetermined period of time. At the end of the last named time period, the heat may be cut off altogether or reduced to a predetermined degree, dependent upon the adjustment of the valve operating devices with respect to the scale as shown in Figures 2 and 3.

From the foregoing description of the several forms of the device of the present invention, it is to be noted that the use of the same eliminates attendance on the part of the user to the cooking operation. In fact the present invention contemplates the absence of the user from the scene of cooking throughout the entire operation or for any relatively long period of time after first lighting the burner and adjusting the time and temperature controls to operate at periods and at the temperatures required for the material to be cooked.

It will be further noted that the connections between burner valves and their operating devices are such as will permit of using the burners without regard to the presence of the invention; it being obvious that on account of the loose mounting of segment 12, in Figure 1, or its counterpart in any of the other forms, any valve when turned to open position, may be freely turned in the opposite direction or to closed position without interference on the part of the disks etc.

Although I have shown and described an ideal embodiment of my invention, it is obvious that the same is susceptible of various modifications and uses and I reserve the right to such use of these as may come within the scope of the appended claims.

I claim:—

1. A device of the type described comprising a valve, thermostatic means for controlling said valve, manually controlled means for determining the temperature at which the thermostatic means will control said valve, and manually adjustable time-regulated means for closing off the flow of gas to said valve, said time controlled means being actuated when the temperature within the oven reaches a predetermined point.

2. A device of the type described comprising a valve, means for partially closing said valve and subsequently entirely closing the valve, time controlled means for releasing said valve moving means for causing it to partially close, manually controlled means for determining the temperature after the valve has been partially closed said time controlled means again releasing said valvemoving means for entirely closing the valve after the valve has remained partially open through a predetermined time interval.

3. A device of the type described comprising a gas burner, a valve controlling the flow of gas, adjustable time controlled means for actuating said valve after predetermined time periods, and manually adjustable means for predetermining the temperatures by adjusting the extent of valve openings after each time period.

4. A device of the type described comprising a gas burner, a valve controlling the flow of gas, adjustable time controlled means for actuating said valve after predetermined time periods, manually adjustable means for predetermining the temperatures by adjusting the extent of valve openings after each time period, a receptacle for food heated by the burner, and a manually adjustable thermostat affected by the temperature within said receptacle for starting the functioning of said timing means when a predetermined temperature has been reached.

5. A device of the type described comprising a gas burner, a valve controlling the flow of gas, adjustable time controlled means for actuating said valve after predetermined time periods, manually adjustable means for predetermining the temperatures by adjusting the extent of valve openings after each time period, a receptacle for food heated by the burner, a manually adjustable thermostat affected by the temperature within said receptacle for starting the functioning of said timing means when a predetermined temperature has been reached, and a second thermostat for regulating the valve.

JOHN F. NEWSOM.